United States Patent
Kihara et al.

(10) Patent No.: US 7,296,783 B2
(45) Date of Patent: Nov. 20, 2007

(54) VACUUM PROCESSING APPARATUS

(75) Inventors: Hideki Kihara, Kudamatsu (JP);
Tsunehiko Tsubone, Hikari (JP);
Nobuo Nagayasu, Kudamatsu (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 11/073,652

(22) Filed: Mar. 8, 2005

(65) Prior Publication Data
US 2006/0169939 A1    Aug. 3, 2006

(30) Foreign Application Priority Data
Feb. 2, 2005  (JP)  ............................. 2005-026611

(51) Int. Cl.
*F16K 3/00*    (2006.01)

(52) U.S. Cl. ....................................... 251/327; 251/193

(58) Field of Classification Search ................ 251/327, 251/167, 193, 195–204, 296, 302; 414/217
See application file for complete search history.

(56) References Cited

U.S. PATENT DOCUMENTS 4,381,100 A * 4/1983 Schoenberg ................ 251/368
6,390,448 B1 * 5/2002 Kroeker et al. ............. 251/167
2004/0129910 A1 * 7/2004 Ishigaki ....................... 251/193

FOREIGN PATENT DOCUMENTS

JP    2002-9125    1/2002

* cited by examiner

*Primary Examiner*—J. Casimer Jacyna
(74) *Attorney, Agent, or Firm*—Antonelli, Terry, Stout & Kraus, LLP.

(57) ABSTRACT

An inexpensive and reliable vacuum processing apparatus is provided. The vacuum processing apparatus comprises a sealed gate located between two vacuum vessels for allowing them to communicate with each other and a sample subjected to processing to be transferred from one of the vacuum vessels to the other therethrough; and a gate valve located on a path of the gate, the gate valve including a first and second valve body facing a first and second opening, respectively, and a shaft to which the valve bodies are coupled at one end thereof, the gate valve selectively opening and closing each of the openings. The gate valve includes an axial drive section coupled to the other end of the shaft for moving the shaft in the axial direction thereof, and a rotary drive section located between the one end and the other end of the shaft for rotating the shaft about a predetermined pivot crossing the axis of the shaft. The rotating force is transmitted to a spot on the shaft between the pivot and the other end along the axis of the shaft.

15 Claims, 7 Drawing Sheets

VACUUM PROCESSING APPARATUS

The present application is based on and claims priority of Japanese patent applications No. 2005-026611 filed on Feb. 2, 2005, the entire contents of which are hereby incorporated by reference.

BACKGROUND OF THE INVENTION

1. Field of the Invention

The invention relates to a vacuum processing apparatus such as, for example, a plasma processing apparatus for processing a sample with plasma, and more particularly to a vacuum processing apparatus having valves located between a plurality of chambers in which the sample is moved.

2. Description of the Related Art

A known vacuum processing apparatus of the type described above comprises an atmospheric transfer chamber where at least one of the cassettes storing samples is installed and a sample is transferred and exchanged with the cassette under atmospheric pressure; a vacuum transfer chamber of a generally polygonal planar shape, having a reduced pressure and maintained at vacuum, where a robot arm for holding and transferring a sample is placed inside; a plurality of process vessels located around the periphery thereof; and a load lock chamber or unload lock chamber connected between the atmospheric transfer chamber and the vacuum transfer chamber and having an inner pressure that can be varied or configured between a reduced pressure (vacuum) equal to that in the vacuum transfer chamber and a pressure (atmospheric pressure) equal to that in the atmospheric transfer chamber, where a sample is exchanged with the atmospheric transfer chamber under atmospheric pressure and with the vacuum transfer chamber under vacuum pressure.

In addition, a configuration including a gate and a gate valve for closing and opening the gate is located between the vacuum transfer chamber and the atmospheric transfer chamber, between the vacuum transfer chamber and the load lock chamber or unload lock chamber, or between the load lock (unload lock) chamber and the atmospheric transfer chamber. The gate partitions the connected chambers and has an opening through which a sample is transferred.

In general, a plurality of such vacuum processing apparatus are located in a user's room such as a clean room adjusted to a predetermined condition to simultaneously process a plurality of samples. To improve the overall efficiency in processing samples and the efficiency in manufacturing devices or other products obtained from the processed samples, it is important to note that many of such apparatus can be installed within a limited area of the room. Therefore, it has been required to reduce the size of the apparatus to decrease its footprint.

To solve this problem, conventionally, the size of the gate valve has been reduced to decrease the footprint of the apparatus. In this conventional art, a plurality of gates with two valves for closing/opening the gate are provided between each pair of the chambers. These valves are connected to a single shaft, which is moved vertically, as well as rotated toward each gate, so that each gate can be selectively closed with the associated valve (see, for example, Japanese Laid-Open Patent Application 2002-009125).

However, the conventional art as described above has some problems because it does not fully take the following points into consideration. The apparatus according to the conventional art described above comprises, between two gates, a first pivotally supported cradle capable of rotating toward the gates, and a second pivotally supported cradle connected to the first cradle, capable of rotating toward the gates, to the second cradle being attached a cylinder for vertically moving a shaft having two valves mounted thereon. The configuration is thus complex, and bulky in the vertical direction.

In addition, the configuration of valves for closing or opening the two gates is complex, which increases time required for maintenance and other handling operations. Moreover, the housing for containing these valves and gates requires a large size, which leads to a larger footprint of the entire processing apparatus.

Furthermore, the apparatus is more prone to vibration, by which wastes and dust are likely to occur from members contained in the housing. This leads to a problem that the wafer is prone to adhesion of foreign particles and contamination.

SUMMARY OF THE INVENTION

An object of the invention is to provide a vacuum processing apparatus that is inexpensive and reliable.

Another object of the invention is to provide a vacuum processing apparatus that has a small footprint.

Still another object of the invention is to provide a vacuum processing apparatus that has a high processing efficiency.

The foregoing object is achieved by a vacuum processing apparatus comprising a sealed gate located between two vacuum vessels for allowing the vacuum vessels to communicate with each other and a sample subjected to processing to be transferred from one of the vacuum vessels to the other therethrough; and a gate valve located on a path of the gate, the gate valve including a first valve body facing a first opening of the gate on one vacuum vessel side, a second valve body facing a second opening of the gate on the other vacuum vessel side, and a shaft to which the valve bodies are coupled at one end thereof, the gate valve selectively opening and closing each of the openings, the gate valve including an axial drive section coupled to the other end of the shaft for moving the shaft in the axial direction thereof, and a rotary drive section located between the one end and the other end of the shaft for rotating the shaft about a predetermined pivot crossing the axis of the shaft, and the rotating force is transmitted to a spot on the shaft between the pivot and the one end or the other end along the axis of the shaft.

In an aspect of the invention, the vacuum processing apparatus further comprises a valve chamber located in the gate, the first valve body and the second valve body being moved inside the valve chamber with motion of the shaft, wherein the first valve body is attached and coupled to the second valve body. Preferably, in the vacuum processing apparatus, after a lid member sealing the valve chamber is opened, the first valve body can be detached through the opened portion out of the valve chamber.

In another aspect of the vacuum processing apparatus according to the invention, the first valve body can be attached to and detached from the second valve body while the second valve body closes the facing opening. Preferably, in the vacuum processing apparatus, the sample is processed in the one vacuum vessel with which the first opening communicates.

In still another aspect of the vacuum processing apparatus according to the invention, the shaft has a first and second shaft divided between the other end of the shaft and the axial drive section and coupled to each other, and the first shaft subjected to force from the rotary drive section can slide and rotate relative to the second shaft at a coupling section between the first and second shafts. Preferably, the vacuum processing apparatus further comprises a bellows attached around the first shaft outside the valve chamber for sealing between the valve chamber and the periphery of the shaft while the gate valve is attached to the vessel having the valve chamber, the bellows being compressed with motion of the shaft.

DETAILED DESCRIPTION OF THE PREFERRED EMBODIMENTS

Figure 1:
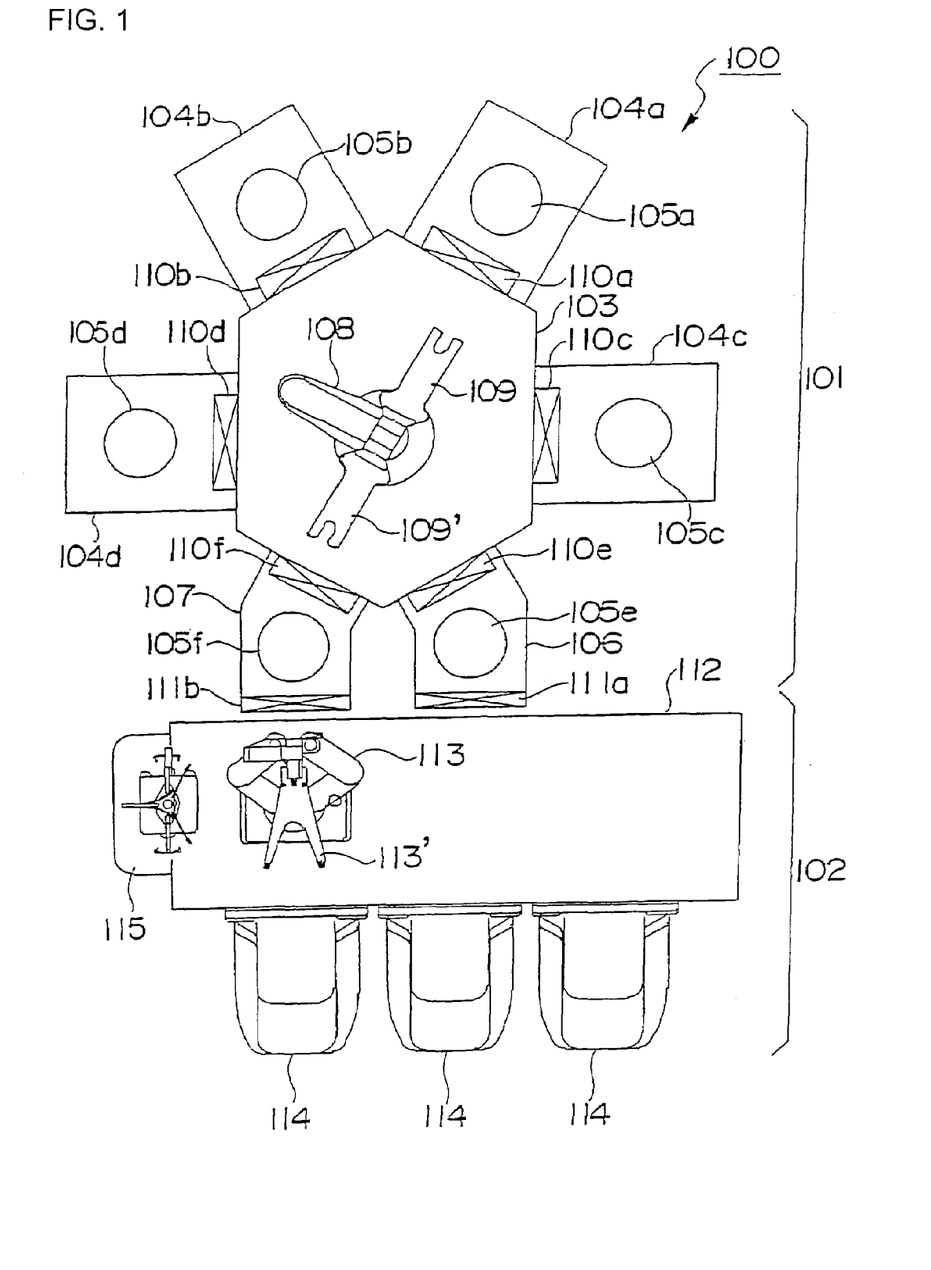
FIG. 1 is a plan view illustrating the configuration overview of the vacuum processing apparatus.

Embodiments of the invention will now be described in detail with reference to the drawings. FIG. 1 is an overview schematically illustrating the configuration of an embodiment of the vacuum processing apparatus according to the invention.

The vacuum processing apparatus 100 shown in this figure can be roughly divided into two parts: a vacuum block 101 located on the upper side of the figure, and an atmospheric block 102 connected thereto, located on the lower side of the figure.

The vacuum block 101 is primarily composed of a plurality of interconnected vacuum vessels having a reduced pressure and maintained at vacuum where a sample subjected to processing is transferred inside, including a vacuum transfer vessel 103 of a generally polygonal (hexagonal) planar shape depicted around the center of the figure, vacuum processing units 104a, 104b, 104c, and 104d, and load lock or unload lock chamber vessels 106, 107 attached to respective edges around the generally polygonal shape. It is noted that each of the load lock or unload lock chamber vessels 106, 107 in this embodiment is configured to be capable of both operations. For simplicity, they are hereinafter referred to as load lock chamber vessels.

Each of the vacuum processing units 104a to 104d and the load lock chamber vessels 106, 107 comprises a vacuum vessel. The pressure inside the vacuum vessel can be reduced to and maintained at the degree of vacuum equal to that inside the vacuum transfer vessel 103. Sample stages 105a to 105d are located in the vacuum vessels. The sample stage has a mounting surface on which a sample subjected to processing is mounted. In particular, samples are processed while being mounted on the sample stages 105a to 105d located in the vacuum processing units 104a to 104d.

In the vacuum transfer vessel 103 is located a vacuum transfer robot 108 for transferring a sample between the sample stages 105a to 105d in the vacuum processing units 104a to 104d, and the sample stages 105e, 105f in the load lock chamber vessels 106, 107, respectively. The vacuum transfer robot 108 has two robot arms 109, 109', each mounting a sample on its upper face to transfer and exchange the sample between the sample stages.

In addition, the vacuum processing units 104a to 104d and the load lock chamber vessels 106, 107 are connected with the vacuum transfer vessel 103 via gate units 110a to 110f, each including a gate partitioning the connection therebetween with an opening through which a sample is transferred, and a gate valve for closing and opening the gate.

The atmospheric block 102 is primarily composed of an atmospheric transfer vessel 112 configured so that it has an inner pressure of about atmospheric pressure and that a plurality of cassettes 114 for enclosing samples can be attached to the front side thereof (lower side in the figure), and an atmospheric transfer robot 113 located in an atmospheric transfer chamber in the atmospheric transfer vessel 112 for exchanging a sample between the cassettes 114 and the load lock chamber vessels 106, 107 in the atmospheric transfer chamber under atmospheric pressure.

In addition, an aligner 115 is attached to the lateral side (left side in the figure) of the atmospheric transfer vessel 112. The aligner 115 adjusts the orientation and position of the sample subjected to processing that has been taken out of the cassette 114 by the robot arm 113' of the atmospheric transfer robot 113.

The load lock chambers 106, 107 are located on the rear side (upper side in the figure) of the atmospheric transfer vessel 112 and connected to the rear face of the atmospheric transfer vessel 112. The load lock chamber vessels 106, 107 are configured so that the pressure therein can be varied from the pressure equal to ambient pressure (atmospheric pressure) around the apparatus to the pressure equal to that inside the vacuum transfer vessel 103.

The load lock chamber vessels 106, 107 are connected to the atmospheric transfer vessel 112 via gate units 111a, 111b, respectively. The atmospheric transfer chamber communicates with the load lock chamber vessel via a gate in the gate unit 111. The gate can be closed/opened by driving a gate valve provided in the gate unit 111.

Figure 2:
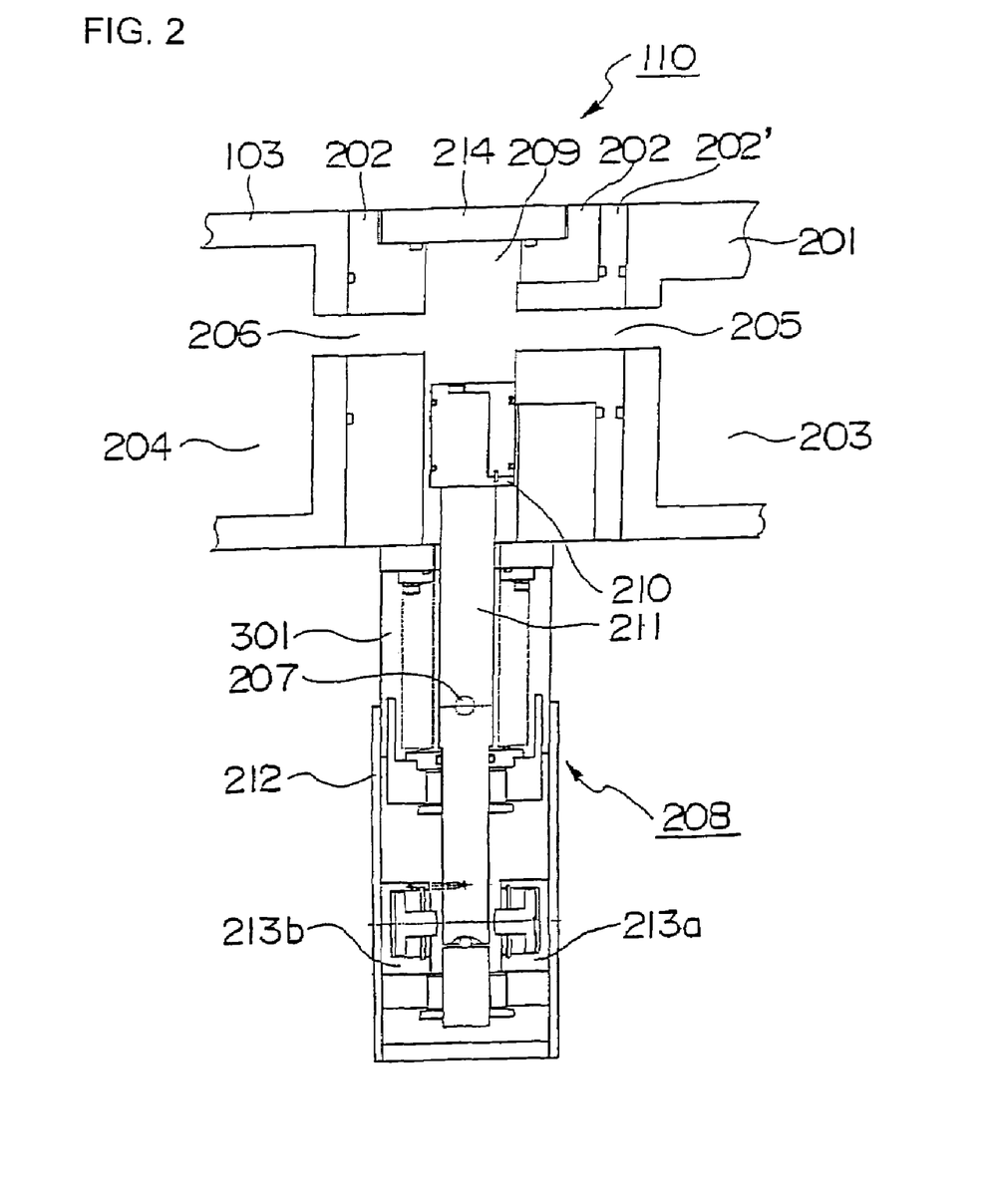
FIG. 2 is a vertical cross section illustrating the configuration of a gate unit.

Referring now to FIG. 2, the gate unit shown in FIG. 1 is described in detail. FIG. 2 is a vertical cross section schematically illustrating the configuration of the gate unit of the vacuum processing apparatus shown in FIG. 1. In this embodiment, the gate unit 110 is generally identical to the gate unit 111 in the configuration of its gate section and gate valve. By way of example, FIG. 2 shows the gate 110a between the processing unit 104a and the vacuum transfer chamber 103.

The gate unit 110 shown in FIG. 2 is located between and coupled to a vacuum vessel 201 constituting the vacuum processing unit 104, and the vacuum transfer vessel 103. The gate unit 110 functions as a sluice valve for opening or closing the gate that allows a process chamber 203 in the vacuum vessel 201 to communicate with a vacuum transfer chamber 204 in the vacuum transfer vessel 103.

Broadly, the gate unit 110 is vertically divided into two parts. The upper part is a gate vessel 202 and the lower part is a gate valve section 208. The gate vessel 202 comprises a vacuum vessel clamp 202' and, as described above, is coupled to the vacuum vessel 201 and the vacuum transfer chamber 103 with bolts or the like. On its inside, the gate vessel 202 comprises gates 205, 206 that are openings with which the process chamber 203 and the vacuum transfer chamber 204 communicate, respectively. The gate vessel 202 also includes a valve chamber 209 that is a space where the openings of the gates 205, 206 are opened and a valve 210 for closing/opening the openings is located inside. The valve 210 can be moved vertically in the valve chamber 209 by a predetermined drive means as described later to be placed at a position where the valve 210 can cover the openings of the gates 205, 206. The valve 210 can also be moved toward each of the gates 205, 206 (toward the process chamber 203 or the vacuum transfer chamber 204) to selectively close the openings.

More specifically, the gate 205 allows the process chamber 203 on the right side of the figure to communicate with the valve chamber 209, and the gate 206 allows the vacuum transfer chamber 204 on the left side of the figure to communicate with the valve chamber 209. In this embodiment, the sample subjected to processing is a substrate such as a semiconductor wafer of a generally circular shape. The gates 205, 206 are shaped like a generally rectangular parallelepiped having a horizontally elongated cross section in conformity with the substrate, and their openings are located at a generally equal height in the vertical direction (top-bottom direction in the figure). Therefore, when the valve 210 is retracted to the lower portion of the valve chamber 209, a sample mounted on the transfer robot 108 (FIG. 1) that has passed through one gate can enter and pass through the other gate without any significant change of the transfer path of the transfer robot 108.

The valve 210, which closes/opens the gates 205, 206, has faces opposite to the openings of the gates, each face contacting the wall of the valve chamber 209 where the associated opening is opened, when the valve 210 is raised to a height where it covers the gates 205, 206. Each of the faces is also provided with a sealing member such as an O-ring that can hermetically seal the associated opening. The valve 210 is coupled to a single shaft 211 located below so that the valve 210 is fixed in position. As the shaft 211 swings, the valve 210 selectively closes one of the gates. That is, the operation of the valve 210 of this embodiment allows one gate to be closed and the other gate to be opened at the same time.

On top of the gate vessel 202 is located a top lid 214 that covers the top of, and can hermetically seal from outside, the valve chamber 209. When the valve chamber 209 is opened to the atmosphere, the top lid 214 can be opened so that the inside of the valve chamber 209 communicates with outside. This configuration allows a user to access the inside of the valve chamber or the valve 210 for work of maintenance, inspection, and component replacement as needed.

In the lower portion of the gate unit 110 is located a gate valve section 208 that includes the valve 210, the shaft 211, and a drive mechanism that is coupled to and drives the shaft 211. The gate valve section 208 has a casing 212 that contains the drive mechanism inside. In the casing 212 are located a plurality of swing cylinders 213a, 213b for swinging the shaft 211 about a predetermined pivot 207 to move the valve 210 toward the gate 205 or gate 206, thereby pressing the valve 210 against the wall of the valve chamber 209.

Each of the two swing cylinders 213a, 213b is operable to push out a piston toward the gate 206 or 205 to press the piston against one end at the bottom of the shaft 211, thereby rotating the shaft 211 and the valve 210 attached to the other end thereof toward the gate 205 or gate 206 about the pivot 207. In particular, in this embodiment, the two swing cylinders 213a, 213b are located opposite to each other, and the spots on the shaft 211 pressed by the pistons-are located generally opposite to each other across the central axis of the shaft 211.

Figure 3:
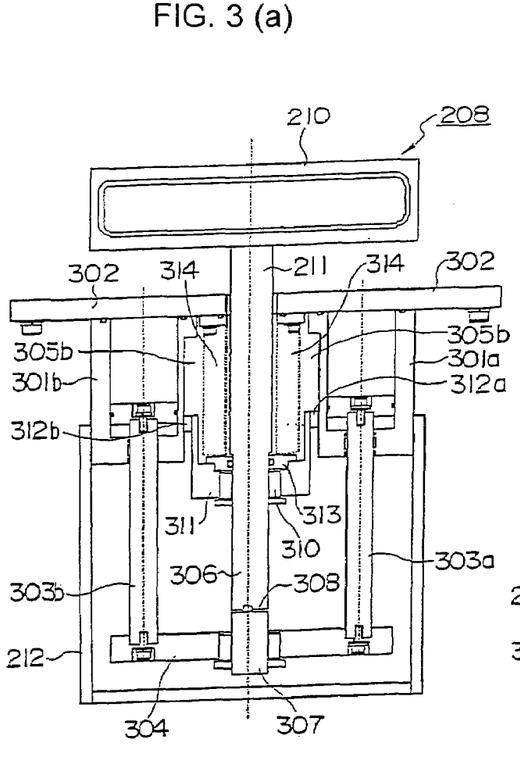
FIG. 3(a) is a vertical cross section illustrating the configuration of a gate valve section.
FIG. 3(b) is a vertical cross section as viewed laterally in FIG. 3(a).

Referring now to FIG. 3, the configuration of the gate valve section is described in more detail. FIG. 3A is a vertical cross section illustrating the configuration of the gate valve section shown in FIG. 2, and FIG. 3B is a vertical cross section as viewed laterally in FIG. 3A. As described above, the gate valve section 208 includes the casing 212 that houses the drive section for the shaft 211, the shaft 211, and the valve 210 coupled thereto.

The gate valve section 208 includes, on both sides of the shaft 211 horizontally in the figure, drive cylinders 301a, 301b for vertically moving the shaft 211. The drive cylinders 301a, 301b include drive shafts 303a, 303b inside, respectively, so that the axis of the drive shafts 303a, 303b is generally parallel to the axis of the shaft 211. As the pressure in the drive cylinders 301a, 301b varies, the drive shafts 303a, 303b are moved along the axis of the shaft 211, respectively. The drive cylinders 301a, 301b are attached to the lower face of the flange 302, the top end thereof being in contact with the gate vessel 202, and constitute the upper portion of the gate valve section 208.

The casing 212 is attached to the outer wall of the drive cylinders 301a, 301b. The casing 212 has an inner space where the drive shafts 303a, 303b are moved with the motion of the drive cylinders 301a, 301b.

Hence, in this embodiment, the drive shafts 303a, 303b extend downward, or in the direction opposite to the valve 201, for the drive cylinders 301a, 301b, respectively. That is, the top end of the drive shafts is coupled to the associated piston inside the drive cylinders 301a, 301b, and the bottom end is coupled to the bottom end of the upper shaft 306 of the shaft 211 via a coupling beam 204.

The shaft 211 in this embodiment is divided into an upper shaft 306 and a lower shaft 307. The upper shaft 306 is coupled to the valve 210, and the lower shaft 307 is coupled to the drive shafts 303a, 303b and the drive cylinders 301a, 301b via the coupling beam 304. There is a coupling section 308 between the upper and lower shafts 306, 307, both of which are moved vertically as the shaft 211 with the motion of the drive cylinders 301a, 301b and the drive shafts 303a, 303b.

The coupling section 308 between the upper shaft 306 and the lower shaft 307 has a curved surface portion of a predetermined spherical shape recessed on the end face of one shaft, and a ball placed between the inside of this curved surface and the end of the other shaft.

The upper shaft 306 is subjected to pressing force caused by the above-described motion of the swing cylinders 213a, 213b to swing about the pivot 207. Therefore, at the coupling section 308, the end of the upper shaft 306 slightly slides relative to the lower shaft 307 coupled via the coupling beam to the drive cylinders 301a, 301b connected to the flange 302. To facilitate this sliding movement, this embodiment includes the coupling section 308 having the above configuration of a curved surface and a ball.

More specifically, the pressing force transmitted through the shaft due to the motion of the pistons in the swing cylinders 213a, 213b allows the bottom end of the upper shaft 306 to smoothly slide on the top end of the lower shaft 307 by slipping or rolling on the surface of the ball placed between the curved surface of the spherically recessed shape formed at the bottom end of the upper shaft 306 and the top end of the lower shaft 307. Thus the upper shaft 306 can swing about the pivot 207.

The upper shaft 307 is fixed at an intermediate height on its vertically extending cylinder portion of a generally cylindrical shape by swaging the surface of the cylinder portion with a mechanical lock 310. The mechanical lock 310 is surrounded by a cupped flange 311 having a bottom portion connected thereto and a sidewall portion located around the upper shaft 306.

At the top end of the outer sidewall of the cupped flange 311 on the side opposite to the drive cylinders 301a, 301b on the left and right of the shaft 211 are located pivots 312a, 312b of a generally cylindrical shape, which are attached to the side face of the drive cylinders 301a, 301b, respectively. The pivots 312a, 312b are engaged into and supported by grooves 305a, 305b formed vertically on the face of the drive cylinders 301a, 301b opposite to the upper shaft 306. Therefore, the cylindrical pivots 312a, 312b are capable of vertical movement and rotation in the grooves 305a, 305b, or the cupped flange 311 is capable of vertical movement and rotation relative to the pivots 312a, 312b fixed in position to and supported by the grooves 305a, 305b.

As described above, the mechanical lock 310 is connected to the cupped flange 311 at the bottom thereof, and coupled and fixed in position to the upper shaft 306. Directly above the mechanical lock 310 is located a vacuum seal 313 having sealing material for hermetically sealing the surface of the cylindrical shape of the upper shaft 306.

Furthermore, a bellows 314 extensible in the axial direction of the upper shaft 306 is connected to the top of the vacuum seal 313 for hermetic sealing between inside and outside. The bellows 314 surrounds the cylindrical sidewall of the upper shaft 306 above the vacuum seal 313. The top end of the bellows 314 is connected to the lower face of the flange 302 to seal between the inside and outside of the bellows 314.

In this embodiment, the bellows 314 is made of metal. Its bottom end is connected to the vacuum seal 313, so that hermetic sealing is made between the inside and outside of the bellows 314. The valve chamber 209 and the inside of the bellows 314 communicating with each other via a gap between the flange 302 and the surface of the upper shaft 306 are thus in a vacuum condition at a high level. On the other hand, the inside of the gate valve section 208 outside the bellows 314 is under ambient pressure, which causes force based on the large difference of pressure to be acted on both of them. Upward motion of the drive shafts 303a, 303b causes the upper shaft 306 constituting the shaft 211 to also move upward, and in turn the vacuum seal 313 connected and coupled thereto moves upward. As a result, the bellows 314 connected to the vacuum seal 313 and located above is compressed against the flange 302.

When the upper shaft 306 is moved upward and reaches at a position where the valve 210 coupled thereto covers the openings of the gates 205, 206, the motion of the drive pistons 301a, 301b is stopped and the upward motion of the shaft 306 is also stopped. From this state, one of the swing cylinders 213a, 213b is driven so that the upper shaft 306 is swung about the pivot 207, that is, the cylindrical pivot 312. In this situation, the pivot 207 or pivot 312 is in the vicinity of the flange 302. The shaft 211 (upper shaft 306) can be rotated in this situation to reduce the gap between the upper shaft 306 and the flange 302.

It is noted that in this embodiment, a spring 315 is placed in the vicinity of the location where the shafts of the swing cylinders 213a, 213b are pressed against the upper shaft 306. The spring 315 is an elastic body for biasing the upper shaft 306 against the displacement due to the rotation or swing thereof. This applies force to the swung and slid upper shaft 306 to move it back opposite to its displacement when the pressing force of the piston of the swing cylinder 213a or 213b pressed against the upper shaft 306 is weakened or removed. While the spring 315 is placed only in the direction toward one gate in the figure, another spring is preferably attached in the other direction.

Figure 4:
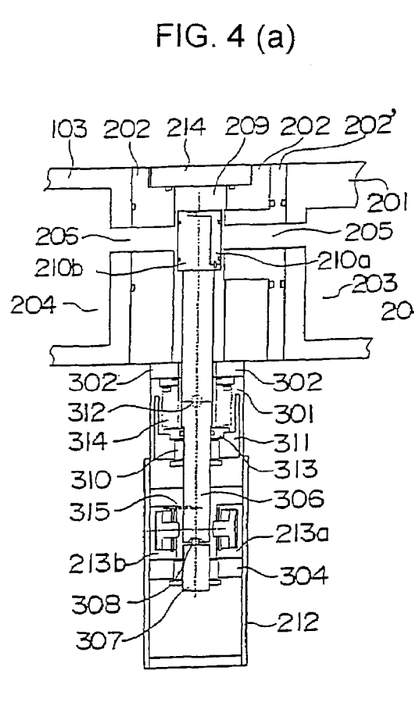
FIGS. 4(a) and 4(b) are vertical cross sections illustrating the operation of the gate unit.

Referring now to FIG. 4, the operation of the gate valve section 208 in the gate unit 110 is described in detail. FIG. 4 is a vertical cross section illustrating the operation of the gate valve of the vacuum processing apparatus shown in FIG. 2. FIG. 4A is a vertical cross section illustrating the state in which the valve is raised, where the valve closes neither left nor right gate. FIG. 4B is a vertical cross section illustrating the state in which the raised valve closes the gate on the vacuum vessel side.

Referring initially to FIG. 4A, the operation of closing the gate 205 on the process chamber 203 side is described. After this operation, the process chamber 203 is sealed from the vacuum transfer chamber 204 and the valve chamber 209 by the valve 210a of the valve 210 facing the gate 205 on the process chamber side, and a sample mounted on the sample stage in the process chamber 203 is processed. Reaction products generated in this process, plasma, and gas are prevented from migrating to the side of vacuum transfer chamber 204 and the valve chamber 209 via the gate 205.

First, the valve 210 is located below the gates 205, 206 as shown in FIG. 3. The valve 210 is then raised to a position where it can face and cover the gates 205, 206. To this end, the drive cylinders 301a, 301b are operated to adjust their inner gas pressure and move the pistons in the cylinders, there by moving upward the drive shafts 303a, 303b connected to the pistons. The lower shaft 307 coupled to the drive cylinders 301a, 301b via the coupling beam 304 coupled to the bottom end of the drive shafts 303a, 303b, and the upper shaft 306 coupled thereto via the coupling section 308 are moved upward. In this way, the valve 210 coupled to the top end of the shaft 211 is raised to a predetermined height where the valve 210 can cover the gates as described above, and maintained at this height.

As the upper shaft 306 is raised, the mechanical lock 310 connected to the outer periphery of the upper shaft 306 and the vacuum seal 313 connected to the top of the upper shaft 306 are also raised. As the vacuum seal 313 is raised, the bellows 314 connected between the vacuum seal 313 and the overlying flange 302, with the connection being sealed, are compressed.

In addition, the flange 311 connected to the outer periphery of the mechanical lock 310 and the pivots 312a, 312b connected to the flange 311 are also raised. In particular, the pivots 312a, 312b are raised inside and along the associated engaging grooves 305a, 305b formed on the side face of the drive cylinders 301a, 301b. When the valve 210 reaches a predetermined height where it can cover the gates 205, 206, the pivots 312a, 312b reach immediately below the flange 302. That is, the grooves 305a, 305b, in which the pivots 312a, 312b are moved, reach immediately below the flange 302.

When the valve 210 is raised to a height where it can cover the gates 205, 206 as shown in FIG. 4A, the process chamber valve 210a and the vacuum transfer chamber valve 210b are separated from the openings of the gates 205, 206 by minute gaps. In this state, neither gate is in contact with, or closed by, the process chamber valve 210a or the vacuum transfer chamber valve 210b. Subsequently, the upper shaft 306 is swung to move one end thereof toward one of the gates, thereby moving the valve 210 coupled to the end toward the one gate so that the valve 210 covers the opening of the gate with pressure. At this time, the valve 210 moves away from the other gate. FIG. 4B shows this state.

FIG. 4B shows the state in which the process chamber valve 210*a* of the valve 210 is pressed against the inner wall of the valve chamber 209 having the opening of the process chamber gate 205 so that the opening is closed. That is, the upper shaft 306 is rotated or swung about the pivot 312 in the clockwise direction in the figure, thereby being moved toward and pressed against the gate 205.

In this situation, first, out of the swing cylinders 213*a*, 213*b* with the pistons or shafts driven thereby located opposite to each other across the upper shaft 306 toward the gates at the bottom end of the upper shaft 306, the swing cylinder 213*a* located on the process chamber 203 side (with its piston or shaft directed to the vacuum transfer chamber 204 on the opposite side) is driven. This driving allows the piston or shaft located in the swing cylinder 213*a* and coupled thereto to be pushed out toward the upper shaft 306, and pressed against a flat portion provided on the process chamber side of the cylindrical portion at the bottom end of the upper shaft 306. As a result, the bottom end of the upper shaft 306 is slid at the coupling section 308 toward the vacuum transfer chamber 204 side, the opposite side of the process chamber 203, relative to the lower shaft 307, and rotated about the pivot 312.

With this motion, the process chamber valve 210*a* of the valve 210 attached to the top end of the upper shaft 306 is moved toward the process chamber gate 205, and pressed against the inner wall of the valve chamber 209 around the opening of the gate 205. On the face of the process chamber valve 210*a* in contact with the wall is placed sealing means such as an O-ring. This O-ring, for example, is pressed against the wall of the valve chamber 209 and deformed with surrounding the outer periphery of the opening of the gate 205, thereby sealing the opening and the inside of the gate 205 having the opening from the inside of the valve chamber 209.

Figure 5:
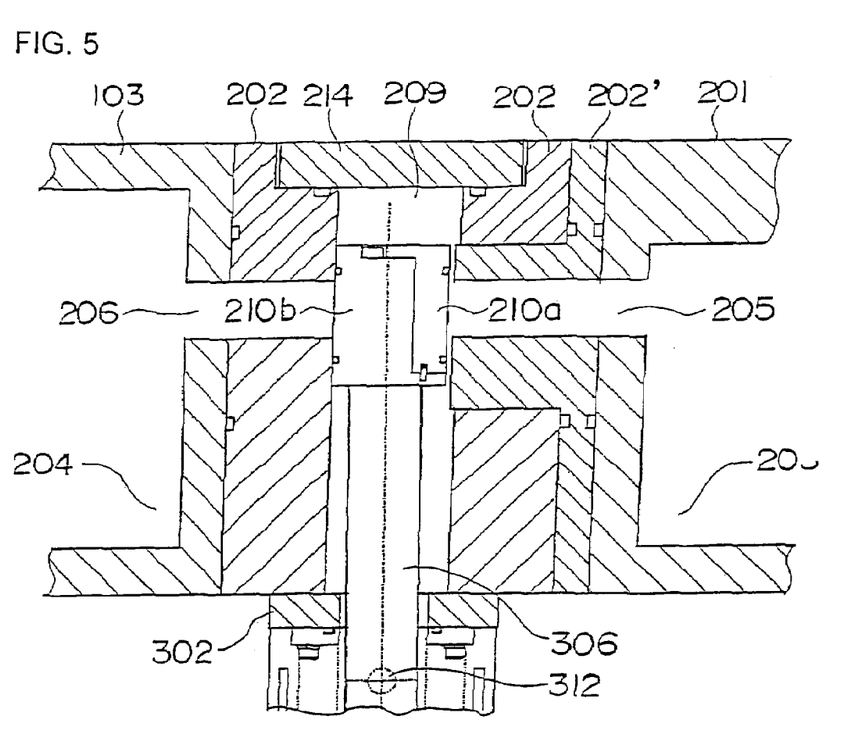
FIG. 5 is a vertical cross section of a relevant part illustrating the closed state on the vacuum transfer chamber side of the gate unit.

Next, FIG. 5 is used to describe the state in which the vacuum transfer chamber 204 is closed and sealed from the valve chamber 209 by the vacuum transfer chamber valve 210*b*. FIG. 5 is a vertical cross section illustrating the operation of the gate valve of the vacuum processing apparatus shown in FIG. 2, and more particularly, an enlarged vertical cross section illustrating the state in which the valve closes the gate on the vacuum transfer chamber side.

When the opening of the gate 206 on the vacuum transfer chamber 204 side is closed, the valve 210 is moved opposite to the motion shown in FIG. 4. First, out of the swing cylinders at the bottom end of the upper shaft 306, the swing cylinder 213*b* located on the vacuum transfer chamber 204 side (with its piston or shaft directed to the process chamber 203 on the opposite side) is driven. This driving allows the piston or shaft located inside the swing cylinder 213*b* and coupled thereto to be pushed out toward the upper shaft 306, and pressed against a flat portion provided on the vacuum transfer chamber 204 side of the cylindrical portion at the bottom end of the upper shaft 306. As a result, the bottom end of the upper shaft 306 is slid at the coupling section 308 toward the process chamber 203 side, the opposite side of the vacuum transfer chamber 204, relative to the lower shaft 307, and rotated about the pivot 312.

FIG. 5 shows the state in which the vacuum transfer chamber valve 210*b* of the valve 210 is pressed against the inner wall of the valve chamber 209 having the opening of the vacuum transfer chamber gate 206 so that the opening is closed. That is, the upper shaft 306 is rotated or swung about the pivot 312 in the counterclockwise direction in the figure, thereby being moved toward and pressed against the gate 206.

With the motion of the swing cylinder 213*b* and the upper shaft 306, the vacuum transfer chamber valve 210*b* of the valve 210 attached to the top end of the upper shaft 306 is moved toward the vacuum transfer chamber gate 206, and pressed against the inner wall of the valve chamber 209 around the opening of the gate 206. As with the process chamber valve 210*a*, on the face of the vacuum transfer chamber valve 210*b* in contact with the wall is placed sealing means such as an O-ring. This O-ring, for example, is pressed against the wall of the valve chamber 209 and deformed with surrounding the outer periphery of the opening of the gate 206, thereby sealing the opening and the inside of the gate 206 having the opening from the inside of the valve chamber 209.

In this situation, the valve chamber 209 is in communication with the process chamber 203 via the gate 205. When one of the chambers is opened to the atmosphere and its pressure is set equal to ambient pressure, the other is also allowed to have the same pressure. For example, the process chamber 203 may be allowed to have atmospheric pressure for component replacement, maintenance, and other services in the process chamber 203 of the vacuum processing unit 104.

In this case, according to this embodiment, the gate 206 on the vacuum transfer chamber 204 side is closed by the valve 210*b* so that the process chamber 203 can be opened to the atmosphere while the vacuum transfer chamber 204 has a reduced pressure and is maintained at vacuum. There is no need to open the vacuum transfer chamber 204 to the atmosphere. While the vacuum processing unit 104 (vacuum vessel 201) is serviced, other processing units and load lock chambers connected to the vacuum transfer chamber 204 and the vacuum transfer vessel 103 can be used to process samples. Therefore, the operating rate of the apparatus and working efficiency are increased, and thereby the sample throughput is enhanced.

In addition, when the process chamber 203 is opened to the atmosphere, the valve chamber 209 is also opened to the atmosphere. An operator can access and work on the valve 210 and the inside of the valve chamber 209. Therefore, the gate unit 110 can be serviced concurrently with services on the vacuum processing unit 104 side.

Figure 6:
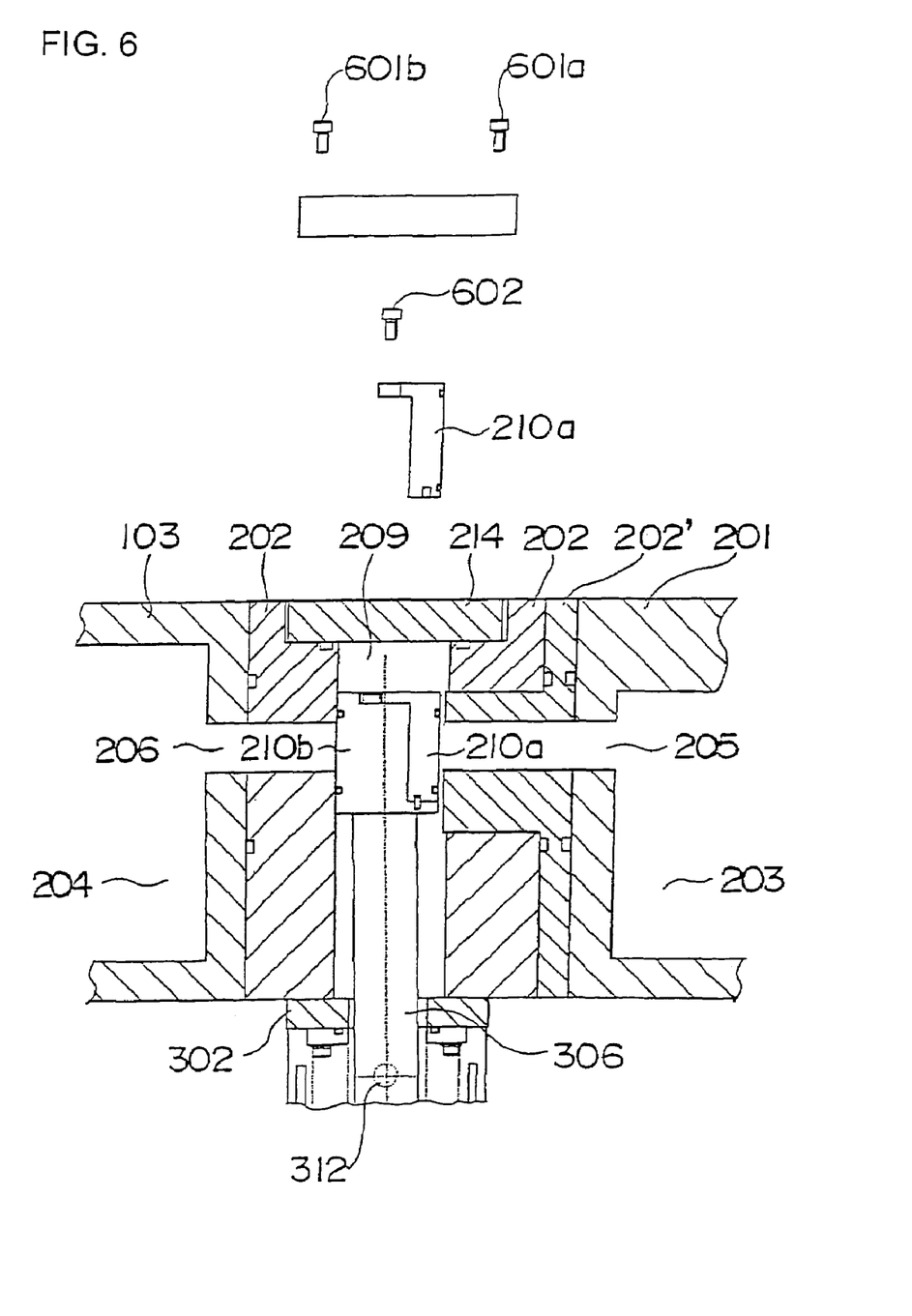
FIG. 6 is a vertical cross section illustrating the detached state of the gate valve.

With reference to FIG. 6, operations for attaching/detaching the valve 210 of the gate unit 110 are described. FIG. 6 is a vertical cross section illustrating, in the upper portion, the detached state of the valve 210 of the gate valve of the vacuum processing apparatus shown in FIG. 2.

In this embodiment, service for the valve 210 shown in FIG. 6 begins with the state shown in FIG. 5. In this embodiment, the valve 210 is detachably configured so that it can be divided into the process chamber valve 210*a* and the vacuum transfer chamber valve 210*b*. Furthermore, the process chamber valve 210*a* is configured so that an operator can work for attachment/detachment while the vacuum transfer chamber valve 210*b* closes and seals the gate 206.

As shown in FIG. 6, as with FIG. 5, when the vacuum transfer chamber valve 210*b* of the valve 210 is pressed against the inner wall of the valve chamber 209 on the vacuum transfer chamber 204 side, that is, when the process chamber 203 is in communication with the valve chamber 209, both of them are opened to the atmosphere and the pressure thereof is set approximately to atmospheric pressure. Subsequently, bolts 601*a*, 601*b* fastening the top lid 214 from above are detached, and then the top lid 214 located on top of the gate vessel 202 of the gate unit 110 is detached, thereby opening the valve chamber 209.

At this time, the vacuum transfer chamber valve 210b is fixed in position on the opening of the gate 206 by application of pressing force from the swing cylinder 213b via the upper shaft 306 toward the vacuum transfer chamber 204 side in the valve chamber 209, and pressing force of gas pressure due to the pressure difference between the pressure in the vacuum transfer chamber 204 and the pressure in the valve chamber 209, which is now approximately atmospheric pressure. In this situation, the process chamber valve 210a can be detached.

In this respect, the process chamber valve 210a is coupled to the vacuum transfer chamber valve 210b on top thereof. As viewed in the cross section at the coupling portion, the process chamber valve 210a has a flange portion of an inverted L-shape, and is coupled to the valve 210 or the top end of the upper shaft 306 with a bolt 602 inserted in a hole passing through the flange portion from above. The flange portion of the process chamber valve 210a has a shape that does not contact the inner wall of the valve chamber 209 when the process chamber valve 210a is attached to the vacuum transfer chamber valve 210b to facilitate detachment and attachment of the process chamber valve 210a. According to this configuration, the process chamber valve 210a can be pulled out upward with keeping the gap from the inner wall of the valve chamber 209 after the bolt 602 attaching and coupling the process chamber valve 210a to the vacuum transfer chamber valve 210b is detached.

The process chamber valve 210a does not have any rotation mechanism for rotatably adapting its contact face to the wall around the opening of the gate 205 depending on the angle between the axis of the shaft 211 and the inner wall of the valve chamber 209. The valve body of the process chamber valve 210a is attached to the vacuum transfer chamber valve 210b or the top end of the upper shaft 306 and coupled to the vacuum transfer chamber valve 210b with the bolt. Therefore, the configuration can be simplified as compared to having any rotation mechanism. Moreover, this configuration facilitates work from above, and reduces the possibility that the process chamber valve 210a and the valve body thereof contact the inner wall of the valve chamber 209, and generation of foreign particles or dust. Furthermore, the distance between the valve 210 and the inner wall of the valve chamber 209 can be reduced to make them closer to each other. This can reduce the volume and footprint of the gate unit 110a, which leads to reduction of the footprint of the entire vacuum processing apparatus.

Figure 7:
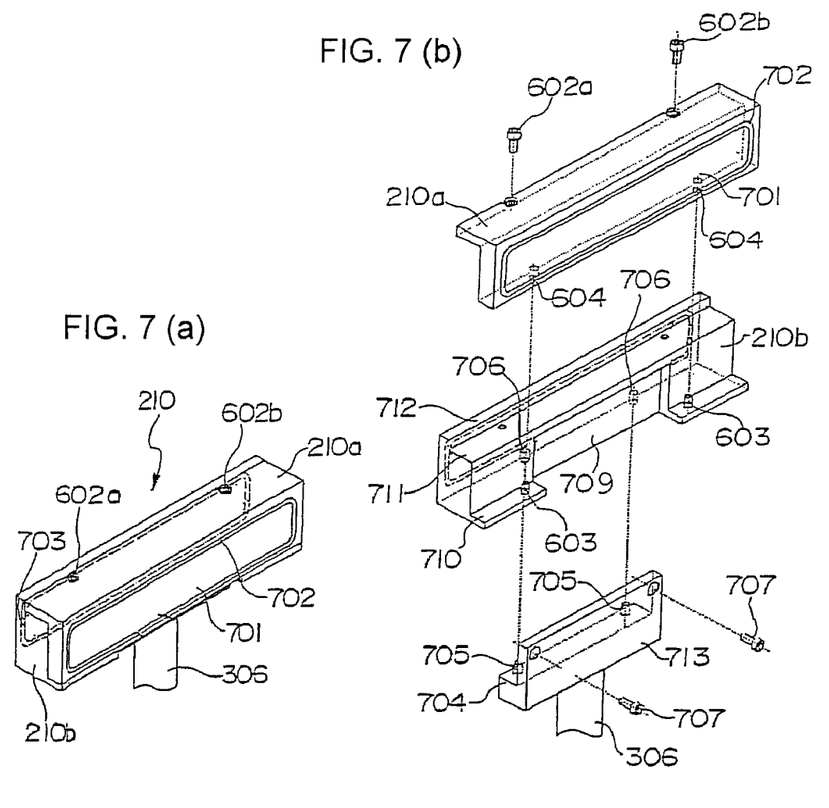
FIGS. 7(a) and 7(b) are perspective views illustrating the structure of the gate.

When the process chamber valve 210a is taken out, the O-ring or other sealing member and the valve body of the process chamber valve 210a for sealing the opening of the process chamber gate 205, and the main body of the process chamber valve 210a, may be subjected to maintenance, inspection, and replacement. The process chamber valve 210a is attached to the vacuum transfer chamber valve 210b or the top end of the upper shaft 306 by another attaching operation in the valve chamber 209. In order to define the position of the process chamber valve 210a and the vacuum transfer chamber valve 210b relative to each other to enhance sealing performance of the valve 210, as shown in FIG. 7, positioning pins 603 are located on the upper face of the vacuum transfer chamber valve 210b, and on the corresponding lower face of the process chamber valve 210a are formed positioning holes 604 in which the positioning pins 603 are engaged. The valves 210a, 210b are coupled to each other with precision by matching the positioning pins 603 with the positioning holes 604. This reduces leaks due to loss of sealing performance when the process chamber valve 210a is pressed against the gate 205.

After the process chamber valve 210a is attached to the top end of the upper shaft 306, the top lid 214 of the valve chamber 209 or gate section 202 is mounted on the gate section 202 and fastened with the bolts 601a, 601b so that the valve chamber 209 is sealed from outside. In this way, the top lid 214 is attached to the gate section.

Next, FIG. 7 is used to describe the configuration of coupling between the process chamber valve 210a and the vacuum transfer chamber valve 210b constituting the valve 210. FIG. 7 is a perspective view illustrating the configuration of the valve 210 of the gate valve of the vacuum processing apparatus shown in FIG. 2.

As shown in this figure, in this embodiment, the process chamber valve 210a constituting the valve 210 is provided with an O-ring 702 on its seal face 701 for closing the periphery of the opening of the associated gate 205. The process chamber valve 210a is attached to the top of the vacuum transfer chamber valve 210b from above in the figure and coupled thereto with bolts 602a, 602b. In particular, as shown in FIG. 7B, the vacuum transfer chamber valve 210b has a horizontally elongated, generally rectangular parallelepiped shape for closing the opening of the gate adapted to the shape of a transferred sample such as a semiconductor wafer subjected to processing. On top of the vacuum transfer chamber valve 210b are a plurality of steps 710, 711, 712. The lower face of the process chamber valve 210a is formed to contact these steps in an adapted manner. The positioning pins 603 located on the step 710 of these steps are engaged in the positioning holes 604 located on the lower face of the process chamber valve 210a so that the valves are attached to each other.

The vacuum transfer chamber valve 210b is connected to a coupling flange 713 located on top of the upper shaft 306 via positioning protrusions 705 formed on the step 704 of the coupling flange 713 and positioning holes 706 of the vacuum transfer chamber valve 210b at a recessed portion 709 having a flat surface for connection on the opposite side of the seal face. The coupling flange 713 is fastened to the vacuum transfer chamber valve 210b with bolts 707.

According to this configuration, the process chamber valve 210a is configured to be attached to and detached from the vacuum transfer chamber valve 210b while the vacuum transfer chamber valve 210b closes the opening of the gate 206. The vacuum transfer chamber valve 210b is coupled to the shaft 211 (306) at a planar flange portion, which enables uniform application of large force in closing the opening of the gate 205, and thus its sealing performance for a valve is enhanced. The sealing performance of the process chamber valve 210a is enhanced as well.

What is claimed is:

1. A vacuum processing apparatus comprising:
   a sealed gate located between two vacuum vessels for allowing the vacuum vessels to communicate with each other and a sample subjected to processing to be transferred from one of the vacuum vessels to the other therethrough; and
   a gate valve located on a path of the gate, the gate valve including a first valve body facing a first opening of the gate on one vacuum vessel side, a second valve body facing a second opening of the gate on the other vacuum vessel side, and a shaft to which the valve bodies are coupled at one end thereof, the gate valve selectively opening and closing each of the openings, the gate valve including an axial drive section coupled to the other end of the shaft for moving the shaft in the axial direction thereof, and a rotary drive section located between the one end and the other end of the shaft for rotating the shaft about a predetermined pivot crossing the axis of the shaft, the rotating force is transmitted to a spot on the shaft between the pivot and the one end or the other end along the axis of the shaft, and further comprising a valve chamber located in the gate, the first valve body and the second valve body being moved inside the valve chamber with motion of the shaft, wherein the first valve body is attached and coupled to the second valve body and the first valve body can be attached to and detached from the second valve body while the second valve body closes the facing opening, the shaft has a first shaft and a second shaft divided between the other end of the shaft and the axial drive section and coupled to each other, the first shaft subjected to force from the rotary drive section can slide and rotate relative to the second shaft at a coupling section between the first and second shafts, and the sample is processed in the one vacuum vessel with which the first opening communicates.

2. A vacuum processing apparatus comprising:

a sealed gate located between two vacuum vessels for allowing the vacuum vessels to communicate with each other and a sample subjected to processing to be transferred from one of the vacuum vessels to the other therethrough; and a gate valve located on a path of the gate, the gate valve including a first valve body facing a first opening of the gate on one vacuum vessel side, a second valve body facing a second opening of the gate on the other vacuum vessel side, and a shaft to which the valve bodies are coupled at one end thereof, the gate valve selectively opening and closing each of the openings, the gate valve including an axial drive section coupled to the other end of the shaft for moving the shaft in the axial direction thereof, and a rotary drive section located between the one end and the other end of the shaft for rotating the shaft about a predetermined pivot crossing the axis of the shaft, the rotating force is transmitted to a spot on the shaft between the pivot and the one end or the other end along the axis of the shaft, and wherein the shaft has a first shaft and a second shaft divided between the other end of the shaft and the axial drive section and coupled to each other, and the first shaft subjected to force from the rotary drive section can slide and rotate relative to the second shaft at a coupling section between the first and second shafts.

3. A vacuum processing apparatus comprising:

a sealed gate located between two vacuum vessels for allowing the vacuum vessels to communicate with each other and a sample subjected to processing to be transferred from one of the vacuum vessels to the other therethrough; and a gate valve located on a path of the gate, the gate valve including a first valve body facing a first opening of the gate on one vacuum vessel side, a second valve body facing a second opening of the gate on the other vacuum vessel side, and a shaft to which the valve bodies are coupled at one end thereof, the gate valve selectively opening and closing each of the openings, the gate valve including an axial drive section coupled to the other end of the shaft for moving the shaft in the axial direction thereof, and a rotary drive section located between the one end and the other end of the shaft for rotating the shaft about a predetermined pivot crossing the axis of the shaft, the rotating force is transmitted to a spot on the shaft between the pivot and the one end or the other end along the axis of the shaft, and wherein the shaft has a first shaft and a second shaft divided between the other end of the shaft and the axial drive section and coupled to each other, and the first shaft subjected to force from the rotary drive section can slide and rotate relative to the second shaft at a coupling section between the first and second shafts, and further comprising a bellows attached around the first shaft outside the valve chamber for sealing between the valve chamber and the periphery of the shaft while the gate valve is attached to the vessel having the valve chamber, the bellows being compressed with motion of the shaft.

4. A vacuum processing apparatus with at least two vacuum vessels, comprising:

a sealed gate located between two vacuum vessels for allowing the vacuum vessels to communicate with each other and a sample subjected to processing to be transferred from one of the vacuum vessels to the other therethrough;

a gate valve located on a path of the gate, the gate valve including a first valve body facing a first opening of the gate on one vacuum vessel side, a second valve body facing a second opening of the gate on the other vacuum vessel side, and a shaft to which the valve bodies are coupled at one end thereof, the gate valve selectively opening and closing air-tightly each of the openings by the valve bodies according to a movement of the shaft; and a driving device which drives the shaft to push the first valve body or the second valve body toward the first opening or the second opening, respectively, wherein the first valve body comprises a plane portion disposed at an opposite side of a closing side and is coupled to the shaft by the plane portion and is connected to another plane portion of a member disposed at the one end of the shaft, and wherein the second valve body is coupled with respect to the first valve body so that the second valve body can be attached to and detached from the first valve body.

5. A vacuum processing apparatus according to claim 4, wherein the second valve body is coupled to the first valve body so that the second valve body can be attached to and detached from the first valve body while the first valve body closes the first opening air-tightly.

6. A vacuum processing apparatus according to claim 4, wherein, while the first valve body closes the first opening air-tightly, one chamber inside the one of the vacuum vessels can be maintained at its pressure different from that of another chamber inside the other vacuum vessel.

7. A vacuum processing apparatus according to claim 6, wherein the second valve body is coupled to the first valve body so that the second valve body can be attached to and detached from the first valve body while the first valve body closes the first opening air-tightly.

8. A vacuum processing apparatus according to claim 4, wherein the second valve body is directly coupled to the first valve body.

9. A vacuum processing apparatus according to claim 4, wherein said another plane portion is a coupling flange of said member, at the one end of the shaft.

10. A vacuum processing apparatus with at least two vacuum vessels, comprising:

a sealed gate located between two vacuum vessels for allowing the vacuum vessels to communicate with each other and a sample subjected to processing to be transferred from one of the vacuum vessels to the other therethrough;

a gate valve located on a path of the gate, the gate valve including a first valve body facing a first opening of the gate on one vacuum vessel side, a second valve body facing a second opening of the gate on the other vacuum vessel side, and a shaft to which the valve bodies are coupled at one end thereof, the gate valve selectively opening and closing air-tightly each of the openings by the valve bodies according to a movement of the shaft; and a driving device which drives the shaft to push the first valve body or the second valve body toward the first opening or the second opening, respectively, wherein the first valve body comprises a plane portion disposed at an opposite side of a closing side and is coupled to the shaft by the plane portion and is connected to another plane portion disposed on the one end portion of the shaft, and wherein the second valve body is coupled with respect to the first valve body and the second valve body can be attached to and detached from the first valve body.

11. A vacuum processing apparatus according to claim 10, wherein the second valve body is coupled to the first valve body so that the second valve body can be attached to and detached from the first valve body while the first valve body closes the first opening air-tightly.

12. A vacuum processing apparatus according to claim 10, wherein, while the first valve body closes the first opening air-tightly, one chamber inside the one of the vacuum vessels can be maintained at its pressure different from that of another chamber inside the other vacuum vessel.

13. A vacuum processing apparatus according to claim 12, wherein, the second valve body is coupled to the first valve body so that the second valve body can be attached to and detached from the first valve body while the first valve body closes the first opening air-tightly.

14. A vacuum processing apparatus according to claim 10, wherein the second valve body is directly coupled to the first valve body.

15. A vacuum processing apparatus according to claim 10, wherein, said another plane portion is a coupling flange at the one end of the shaft.

* * * * *